Patented Mar. 23, 1954

2,673,205

UNITED STATES PATENT OFFICE 2,673,205

3-DISUBSTITUTED DIOXOPIPERIDINES AND THE MANUFACTURE THEREOF

Karl Hoffmann, Binningen, and Eugen Tagmann, Basel, Switzerland, assignors to Ciba Pharmaceutical Products, Inc., Summit, N. J.

No Drawing. Application February 4, 1952, Serial No. 269,896

Claims priority, application Switzerland February 13, 1951

5 Claims. (Cl. 260—281)

The present invention relates (a) broadly to 2,6-dioxo-piperidines which are disubstituted in 3-position by an unsaturated cyclic residue and also by an aliphatic hydrocarbon residue of one to six carbon atoms, (b) especially to 3-phenyl-3-alkyl-2,6-dioxopiperidines and (c) more particularly to 3-phenyl-3-ethyl-2,6-dioxo-piperidine of the formula

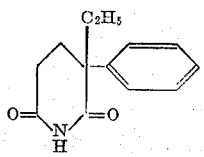

as well as to the manufacture of these compounds.

These compounds may also be designated as cyclic pentane-1,5-diacid-imides. The unsaturated cyclic residue may be a phenyl group or an other aryl residue such as a naphthyl residue or also a heterocyclic, especially a monocyclic heterocyclic residue, such as a pyridyl or thiophene residue. These substituents, such as the phenyl residue, may themselves be substituted, for example by alkyl, substituted hydroxyl and amino groups or halogen atoms. It is also possible that the piperidine ring may contain further substituents, especially in 1-position. Such substituents are for example a lower alkyl group such as the methyl or ethyl group, an aralkyl residue such as the benzyl residue, or an unsubstituted or substituted acyl residue such as the acetyl or benzoyl residue. The aliphatic hydrocarbon residue may be straight or branched, saturated or unsaturated, such as methyl, ethyl, propyl, isopropyl, allyl, butyl, isobutyl, amyl, isoamyl and hexyl.

These new compounds possess valuable pharmacological properties and may be used as medicaments. They have a pronounced anti-convulsive effect; especially effective is the 2-phenyl-3-ethyl-2,6-dioxo-piperidine.

This effect was tested in mice and rats against shocks produced in different ways. Both the electroshock and the shock due to pentamethylene tetrazole were relieved with doses which are too small to produce general toxic symptoms. Spasms due to strychnine or sound irritation can also be suppressed.

According to the invention the specified dioxopiperidines are obtained when pentane-1,5-diacids or their functional derivatives, which acids are disubstituted in 2-position by an unsaturated cyclic residue and also by an aliphatic hydrocarbon residue, are converted into their cyclic imides. According to one feature of the invention the corresponding pentane-1,5-diacids or functional derivatives thereof, such as their halides, are reacted with ammonia or amines. According to a further feature of the invention, the new compounds can also be obtained when the pentane-1,5-acid monoamides or their functional derivatives are intramolecularly acylated. The pentane-1,5-diacid monoamides and their functional derivatives may themselves be formed in the course of the reaction. Thus for example correspondingly substituted pentane-1,5-diacid mononitriles, dinitriles or nitrile esters can be used as starting materials and these treated in the presence or absence of a solvent with condensing agents, such as concentrated sulfuric acid, acetic anhydride, tin tetrachloride or also titanium tetrachloride or boron trifluoride etherates, zinc chloride, aluminum chloride or mixtures thereof. Moreover the diamides, diammonium salts or mononitrile ammonium salts of the pentane-1,5-diacids may be converted by heating into the cyclic imides. The starting materials required in the above process may be produced by conventional methods.

According to the above process dioxo-piperidines are obtained which are unsubstituted or substituted at the ring nitrogen atom. The N-unsubstituted compounds may subsequently be substituted in 1-position, for instance by reacting with reactive esters of alcohols, with aliphatic diazo compounds, especially diazomethane, or with reactive acid derivatives such as acid halides and anhydrides. Reactive esters of alcohols are especially those of strong organic or inorganic acids such as hydrohalic acids, for example hydrochloric acid, or organic sulfonic acids such as para-toluene sulfonic acid. The above-mentioned subsequent substitution is preferably carried out in the presence of condensing agents which, together with the dioxo-piperidines, are capable of forming metal compounds such as alkaline or alkaline earth metals, for example sodium, lithium, calcium, their amides, hydrides, hydrocarbons or alcoholates, i.e. sodium amide, sodium hydride, butyl lithium, phenyl potassium, phenyl lithium, potassium tertiary butylate or potassium tertiary amylate.

The following examples illustrate the invention, the relation between part by weight and part by volume being the same as that between the gram and the cubic centimeter. Temperatures are expressed in degrees centigrade.

Example 1

140 parts by weight of 2-phenyl-2-ethyl-pentane-1,5-diacid-mononitrile-(1) are dissolved in 200 parts by volume of glacial acetic acid and, at an initial temperature of 60°, 100 parts by volume of concentrated sulfuric acid added in portions. In this operation the temperature of the reaction mixture rises to 100° C. The whole is finally maintained for a short time on the boiling water bath, then cooled and poured on ice and neutralized with alkali to a pH=6. Extraction with chloroform is then effected and the chloroform extract washed with dilute caustic soda solution, dried over calcium chloride, the chloroform evaporated and the residue crystallized from ethyl acetate with addition of ligroin. The obtained 3-phenyl-3-ethyl-2,6-dioxo-piperidine of the formula

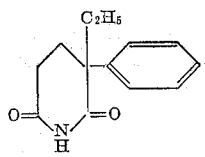

melts at 78–81°.

The 2 - phenyl - 2 - ethyl - pentane - 1,5 - diacid - mononitrile - (1) of melting point 72–76°, used as starting material in this example, can be produced for example from α-phenyl-butyric acid nitrile by condensation with acrylic acid methyl ester and subsequent hydrolysis of the thus-obtained 2-phenyl-2-ethyl-pentane-1,5-diacid-monomethyl ester-mononitrile-(1) of boiling point 176–185° under 12 mm. pressure.

Example 2

85 parts by weight of 2-phenyl-2-isopropyl-pentane-1,5-diacid-mononitrile-(1) are dissolved in 100 parts by volume of glacial acetic acid and, at an initial temperature of 50°, 30 parts by volume of concentrated sulfuric acid introduced in small portions. In this operation the reaction temperature rises to 70° and, after the exothermic reaction has subsided, the whole is maintained for a short time further at a temperature of 100°. By the method of working up described in Example 1 there is obtained after recrystallization from a mixture of ethyl acetate-ligroin the 3-phenyl-3-isopropyl-2,6-dioxo-piperidine of the formula

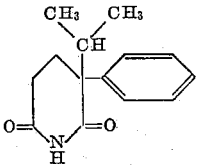

which melts at 115–118°.

The 2-phenyl-2-isopropyl-pentane-1,5-diacid-mononitrile-(1) used as starting material in this example can be produced by a method analogous to that described in Example 1 by using, instead of α-phenyl-butyric acid nitrile, α-phenyl-β-methyl-butyric acid nitrile for reaction with methyl acrylate. The 2-phenyl-2-isopropyl-pentane-1,5-diacid-monomethyl ester-mononitrile-(1) produced boils at 174–185° under 12 mm. pressure and the nitrile-carboxylic acid obtained therefrom by hydrolysis melts at 80–82°.

Example 3

To 49 parts by weight of 2-phenyl-2-(2'-methyl-propyl)-pentane-1,5-diacid-mononitrile-(1), dissolved in 100 parts by volume of glacial acetic acid, 25 parts by volume of concentrated sulfuric acid are added in portions and the whole thereupon heated on the boiling water bath. By following the methods of working up described above there is obtained after recrystallization from ethyl acetate with addition of ligroin, the 3-phenyl-3-(2'-methyl-propyl)-2,6-dioxo-piperidine of melting point 78–81° and of the formula

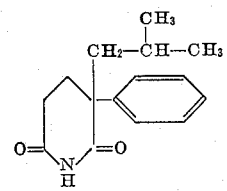

The 2-phenyl-2-(2'-methyl-propyl)-pentane-1,5-diacid-mononitrile-(1) of melting point 67–70° used as starting material in this example, can be produced in an analogous manner to that described in Example 1 by reacting with methyl acrylate, instead of α-phenyl-butyric acid nitrile, α-phenyl-γ-methyl-valeric acid nitrile. The 2-phenyl-2-(2'-methyl-propyl)-pentane-1,5-diacid-monomethyl ester-mononitrile-(1) thus produced boils at 144–153° under 0.08 mm. pressure and can be hydrolyzed for example with methyl alcoholic caustic potash solution, to the 2 - phenyl - 2 - (2' - methyl - propyl) - pentane - 1,5 - diacid - mononitrile - (1).

Example 4

To 73 parts by weight of 2 - phenyl - 2 - (3' - methyl - butyl) - pentane - 1,5 - diacid - mononitrile - (1), dissolved in 140 parts by volume of glacial acetic acid, 30 parts by volume of concentrated sulfuric acid are added in portions and the reaction mixture thereupon heated for a short time to 95–100°. By following the above described method of working up, there is obtained the 3-phenyl-3-(3'-methyl-butyl)-2,6-dioxo-piperidine of the formula

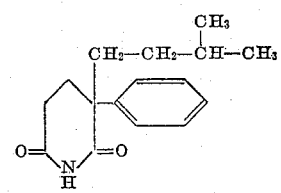

which when recrystallized from a mixture of ethyl acetate and ligroin melts at 65–68°.

The 2-phenyl-2-(3'-methyl-butyl)-pentane-1,5-diacid-mononitrile-(1), which is used as starting material in this example, can be produced in an analogous manner to that described in Example 1, by reacting α-phenyl-δ-methyl-caproic acid nitrile, instead of α-phenyl-butyric acid nitrile, with methyl acrylate. The 2-phenyl-2-(3'-methyl-butyl)-pentane-1,5-diacid-monomethyl ester-mononitrile-(1) thereby produced boils at 140–156° under 0.1 mm. pressure and the 2 - phenyl - 2 - (3' - methyl - butyl) - pentane-1,5 - diacid-mononitrile-(1) obtained therefrom by hydrolysis with methyl alcoholic caustic potash solution, melts at 65–71°.

Example 5

To 95 parts by weight of 2-phenyl-2-(n-amyl)-pentane-1,5-diacid-mononitrile-(1), dissolved in 200 parts by volume of glacial acetic acid, 70 parts by volume of concentrated sulfuric acid are added and the whole is then heated for a short time to 95–100°. The reaction mixture is worked up by the method described in Example 1, and 3-phenyl-3-(n-amyl)-2,6-dioxo-piperidine of the formula

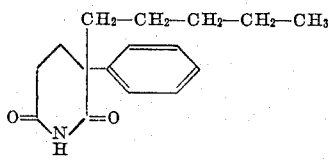

is obtained as an oil which distils at 181–186° under 0.3 mm. pressure. The substance crystallizes on standing and when recrystallized from aqueous alcohol has a melting point of 43–45°.

The 2-phenyl-2-(n-amyl)-pentane-1,5-diacid-mononitrile-(1), which is used as starting material in this example, can be produced in an analogous manner to that described in Example 1 by reacting with methyl acrylate, instead of α-phenyl-butyric acid nitrile, α-phenyl-oenanthic acid nitrile (B. P. 146–159° under 13 mm. pressure, produced from benzyl cyanide and n-amyl bromide by means of sodamide in ether) and hydrolyzing the 2-phenyl-2-(n-amyl)-pentane-1,5-diacid-monomethyl ester-mononitrile-(1) of boiling point 145–160° under 0.1 mm. pressure by means of a methyl alcoholic caustic potash solution to the 2-phenyl-2-(n-amyl)-pentane-1,5-diacid-mononitrile-(1).

Example 6

1.0 part by weight of 2-phenyl-2-ethyl-pentane-1,5-diacid-monoamide-(1) is dissolved in 2 parts by volume of glacial acetic acid, then 4 parts by volume of concentrated sulfuric acid are added in portions and the whole is heated for a short time at 90–100°. By the method of working up described in Example 1, there is obtained the 3-phenyl-3-ethyl-2,6-dioxo-piperidine which is identical with the preparation obtained according to the process of Example 1.

Example 7

21.7 parts by weight of 3-phenyl-3-ethyl-2,6-dioxo-piperidine are dissolved in 100 parts by volume of dry toluene and, in a nitrogen atmosphere, 4.4 parts by weight of pulverized sodium amide are added in portions at a temperature of 70–80°. After maintaining the reaction mixture at this temperature for a further 3 hours, while stirring, it is cooled in a mixture of ice and sodium chloride. The whole is then transferred to a pressure vessel, 21.3 parts by weight of methyl iodide are added and the whole is heated in the closed vessel for 6 hours at 120–130°. After cooling, the toluene solution is washed with dilute caustic soda solution and water, dried over sodium sulfate, the solvent evaporated and the residue distilled under reduced pressure. The thus obtained 1-methyl-3-phenyl-3-ethyl-2,6-dioxo-piperidine of the formula

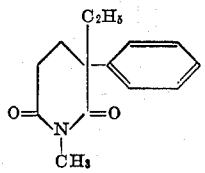

distils in the form of a colorless viscous oil which boils at 138–142° under 0.4 mm. pressure.

Example 8

21.7 parts by weight of 3-phenyl-3-ethyl-2,6-dioxo-piperidine are dissolved in 150 parts by volume of absolute toluene and, in a nitrogen atmosphere, 4.4 parts by weight of pulverized sodium amide are added in portions at a reaction temperature of 80–90°. After maintaining the reaction mixture for a further 3 hours at a temperature of 100–110°, while stirring, it is cooled to 0°. The whole is transferred to a pressure vessel, 18.5 parts by weight of n-propyl bromide are added and the whole is maintained in the closed vessel for 6 hours at 120–130°. By the method of working up described in Example 7 there is obtained the 1-n-propyl-3-phenyl-3-ethyl-2,6-dioxo-piperidine of the formula

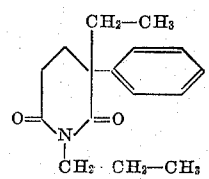

in the form of a colorless, viscous oil which boils at 119–122° under 0.05 mm. pressure.

Example 9

21.7 parts by weight of 3-phenyl-3-ethyl-2,6-dioxo-piperidine are dissolved in 100 parts by volume of absolute toluene and, in a nitrogen atmosphere, 4.4 parts by weight of pulverized sodium amide are added in portions at a temperature of 90–100°. After maintaining the reaction mixture for a further 3 hours at a temperature of 100–110°, while stirring, it is cooled to 0°, 25.7 parts by weight of benzyl bromide are added and the whole is heated in a closed vessel for 6 hours at 120–130°. By the method of working up described in Example 7, there is obtained the 1-benzyl-3-phenyl-3-ethyl-2,6-dioxo-piperidine of the formula

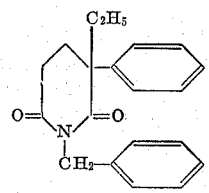

in the form of a viscous oil which distils at 173–176° under 0.07 mm. pressure. The substance crystallizes while standing and melts, recrystallized from a mixture of acetone and isopropyl ether, at 48–52°.

Example 10

16.7 parts by weight of 2-phenyl-2-ethyl-pentane-1,5-diacid are heated for 6 hours with 9.9 parts by weight of aniline in a closed vessel at 150–160°. After cooling, the reaction mixture is taken up in ethyl acetate, washed with dilute hydrochloric acid, dilute caustic soda solution and finally with water, dried over calcium chloride, the solvent is evaporated and the residue distilled under reduced pressure. The thus obtained 1-phenyl-3-phenyl-3-ethyl-2,6-dioxo-piperidine of the formula

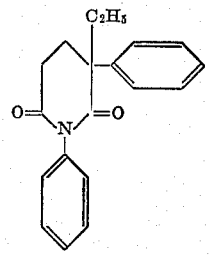

distils at 216–225° under 0.25 mm. pressure, crystallizes on standing and melts, after recrystallization from a mixture of acetone and isopropyl ether, at 96–98°.

Example 11

16 parts by weight of 2-pyridyl-(3)-2-ethyl-pentane-1,5-diacid-dinitrile are dissolved in 25 parts by volume of glacial acetic acid and 30 parts by volume of concentrated sulfuric acid added in portions at an initial temperature of 70°. During this addition, the temperature of the reaction mixture rises to 100–110°. Finally, the mixture is maintained at 110–120° C. for a short while, cooled, poured on to ice and adjusted to a pH 8–9 with alkali, then extracted with chloroform, and the chloroform extract washed with water, and dried over calcium chloride, the solvent is evaporated and the residue distilled in a high vacuum. The 3-pyridyl-(3)-3-ethyl-2,6-dioxo-piperidine of the formula

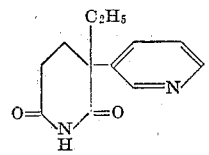

distils as a viscous oil at 164–174° under a pressure of 0.1 mm.

The 2-pyridyl-(3)-2-ethyl-pentane-1,5-diacid-dinitrile used as starting material in this example can be prepared e. g. in the following manner. Pyridyl-(3)-acetic acid nitrile can be converted by condensation with ethyl bromide in the presence of sodamide and ether as solvent into the α-pyridyl-(3)-butyric acid nitrile of boiling point 73–75° (0.1 mm.). From the latter there is obtained the 2-pyridyl-(3)-2-ethyl-pentane-1,5-diacid-dinitrile of boiling point 128–138° C. (0.1 mm. pressure) by subsequent condensation with acrylic acid nitrile in the presence of a basic catalyst and e. g. dioxane as solvent.

Example 12

17.2 parts by weight of 3-phenyl-3-ethyl-2,6-dioxo-piperidine are refluxed for 4 hours with 50 parts by volume of acetic anhydride and 20 parts by volume of dry pyridine. Any excess acetic anhydride and pyridine are evaporated under reduced pressure, the residue taken up in ethyl acetate, the ethyl acetate solution washed with cold dilute caustic soda solution and dilute hydrochloric acid, dried over calcium chloride, the solvent evaporated, and the residue distilled in a high vacuum. The 1-acetyl-3-phenyl-3-ethyl-2,6-dioxo-piperidine of the formula

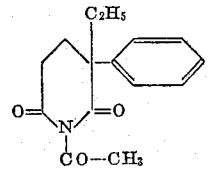

distils as a highly viscous oil of boiling point 172–177° (0.3 mm.).

What is claimed is:

1. A 3,3-disubstituted 2,6-dioxo-piperidine, one of the 3-substituents being a member of the group consisting of a phenyl residue and a pyridyl residue and the other 3-substituent being an aliphatic hydrocarbon residue of one to six carbon atoms.
2. 3-phenyl-3-ethyl-2,6-dioxo-piperidine.
3. 3-phenyl - 3 - (2'-methyl-propyl)-2,6-dioxo-piperidine.
4. 3 - phenyl - 3 - (2'-methyl-butyl)-2,6-dioxo-piperidine.
5. 1-methyl-3-phenyl-3-ethyl-2,6-dioxopiperidine.

KARL HOFFMANN.
EUGEN TAGMANN.

References Cited in the file of this patent

Chem. Abstracts, vol. 32, page 3763 (1938), citing—J. Univ. Bombay, vol. 6, part II, pp. 102–103 (1937).